(12) United States Patent
Kenneth et al.

(10) Patent No.: US 8,631,131 B2
(45) Date of Patent: Jan. 14, 2014

(54) VIRTUAL MACHINE POOL CACHE

(75) Inventors: Michal Kenneth, Tel Aviv (IL); Vitaly Elyashev, Ramat Gan (IL)

(73) Assignee: Red Hat Israel, Ltd., Raanana (IL)

( * ) Notice: Subject to any disclaimer, the term of this patent is extended or adjusted under 35 U.S.C. 154(b) by 124 days.

(21) Appl. No.: 13/227,203

(22) Filed: Sep. 7, 2011

(65) Prior Publication Data
US 2013/0060946 A1 Mar. 7, 2013

(51) Int. Cl.
*G06F 15/173* (2006.01)
(52) U.S. Cl.
USPC ............... 709/226; 709/203; 709/224
(58) Field of Classification Search
USPC .......................... 709/203, 224, 226
See application file for complete search history.

(56) References Cited

U.S. PATENT DOCUMENTS

| 6,223,202 B1* | 4/2001 | Bayeh ........................... 718/102 |
| 2006/0069761 A1* | 3/2006 | Singh et al. ................... 709/222 |
| 2007/0162720 A1* | 7/2007 | Branda et al. ................. 711/173 |
| 2008/0104608 A1* | 5/2008 | Hyser et al. ................... 718/105 |

* cited by examiner

*Primary Examiner* — Yves Dalencourt
(74) *Attorney, Agent, or Firm* — Lowenstein Sandler LLP (57) ABSTRACT

A host controller initiates a virtual machine pool, the virtual machine pool including a plurality of stateless virtual machines. The host controller identifies a virtual machine pool cache size value for the virtual machine pool, the virtual machine pool cache size value indicating a number of active, unassigned, stateless virtual machines to maintain in a virtual machine pool cache for the virtual machine pool. The host controller automatically loads the indicated number of active, unassigned, stateless virtual machines into the virtual machine pool cache for the virtual machine pool prior to receiving a request for one of the plurality of stateless virtual machines.

20 Claims, 8 Drawing Sheets

VIRTUAL MACHINE POOL CACHE

RELATED APPLICATIONS

This application is related to co-pending U.S. patent application Ser. No. 12/489,266, entitled "Method for Automatically Launching A Virtual Machine Associated With A Client During Startup"; co-pending U.S. patent application Ser. No. 12/489,259, entitled "Method for Improving Boot Time of a Client Having a Virtualized Operating Environment"; co-pending U.S. patent application Ser. No. 12/489,273, entitled "Method for Automatically Providing a Client with Access to an Associated Virtual Machine"; and co-pending U.S. patent application Ser. No. 12/489,276, entitled "Automatic Virtual Machine Migration in Mixed SBC/CBC Environment".

TECHNICAL FIELD

Embodiments of the present invention relate generally to virtual machines. More particularly, embodiments relate to techniques for maintaining a virtual machine pool cache.

BACKGROUND

Generally, the concept of virtualization in information processing systems allows multiple instances of one or more operating systems to run on a single system, even though each operating system (OS) is designed to have complete, direct control over the system and its resources. Virtualization is typically implemented by using software (e.g., a virtual machine monitor, or a "VMM") to present to each OS a "virtual machine" ("VM") having virtual resources, including one or more virtual processors, that the OS may completely and directly control, while the VMM maintains a system environment for implementing virtualization policies such as sharing and/or allocating the physical resources among the VMs (the "virtualization environment").

The virtualization technologies have wide applications in the computer field with the development of computer systems. For example, such virtualization technologies can be used to implement a virtual desktop application which runs within a virtual machine of a host and accessed from a client over a network, such as, for example, Red Hat® Enterprise Virtualization, a product of Red Hat, Inc. of Raleigh, N.C.

Typically, after a client machine starts up, a user has to log onto a Web portal via a Web browser to select a VM (e.g., a virtual desktop) to be launched and accessed by the client. That is, a VM is launched in response to receiving a client request for a VM. Launching a VM may take a relatively long period of time. Additionally, when multiple clients request VMs at the same time, this can cause an increased load on a host machine, which may further increase an amount of time that users have to wait. In some situations, VMs may even fail to load properly if too many users request VMs at the same time.

BRIEF DESCRIPTION OF THE DRAWINGS

The present invention is illustrated by way of example and not limitation in the figures of the accompanying drawings in which like references indicate similar elements.

DETAILED DESCRIPTION

Techniques for maintaining active, unassigned virtual machines in a virtual machine pool cache are described herein. In the following description, numerous details are set forth to provide a more thorough explanation of the embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

According to one embodiment of the present invention, a host controller initiates a virtual machine pool, the virtual machine pool including multiple stateless virtual machines. The host controller identifies a virtual machine pool cache size for the virtual machine pool. The virtual machine pool cache size indicates a number of active, unassigned, stateless virtual machines to maintain in a virtual machine pool cache for the virtual machine pool. The host controller automatically loads the indicated number of active, unassigned, stateless virtual machines into the virtual machine pool cache for the virtual machine pool prior to receiving a request for a virtual machine of the virtual machine pool.

Figure 1:
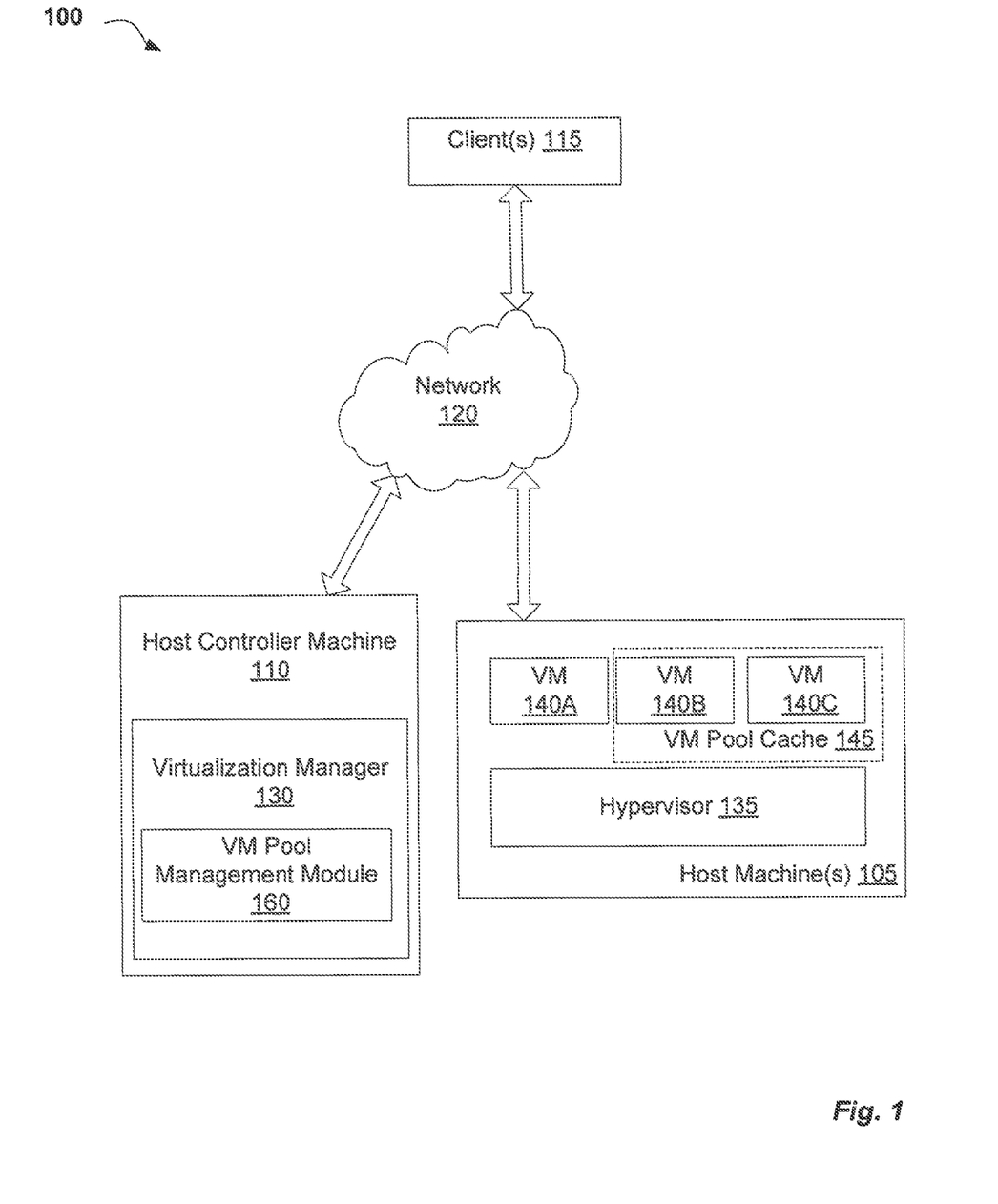
FIG. 1 is a block diagram illustrating an example of a network configuration according to one embodiment of the invention.

FIG. 1 is a block diagram illustrating an example of a network configuration 100 according to one embodiment of the invention. Network configuration 100 includes, but is not limited to, one or more clients 115 communicatively coupled to a host controller machine 110 and/or a host machine or machines 105 via a network 120. Network 120 may be a private network (e.g., a local area network (LAN) or a wide area network (WAN)), a public network (e.g., the Internet), or a combination of one or more networks.

Each host machine 140 is a computing device configured to host virtual machines. The host machine 140 may be a personal computer (PC), server computer, mainframe, or other computing system. The host machine 140 has a bare platform hardware that can include a processor, memory, input/output devices, etc. The host machine 105 may be a single machine or multiple host machines arranged in a cluster.

Host machine 140 includes a hypervisor 135 (also known as a virtual machine monitor (VMM)). The hypervisor 135, though typically implemented in software, may emulate and export a bare machine interface to higher level software. Such higher level software may comprise a standard or real-time operating system (OS), may be a highly stripped down operating environment with limited operating system functionality, may not include traditional OS facilities, etc. In one embodiment, the hypervisor 135 is run directly on bare platform hardware. In another embodiment, the hypervisor 135 is run on top of a host OS. Alternatively, for example, the hypervisor 135 may be run within, or on top of, another hypervisor.

Hypervisors 135 may be implemented, for example, in hardware, software, firmware or by a combination of various techniques. The hypervisor 135 presents to other software (i.e., "guest" software) the abstraction of one or more virtual machines (VMs) 140, which may provide the same or different abstractions to various guest software (e.g., guest operating system, guest applications, etc.).

A virtual machine 140 is a combination of guest software that uses an underlying emulation of a hardware machine (e.g., as provided by a hypervisor). The guest software may include a guest operating system, guest applications, guest device drivers, etc. Virtual machines 140 can be, for example, hardware emulation, full virtualization, para-virtualization, and operating system-level virtualization virtual machines. Each virtual machine 140A, 140B, 140C includes a guest operating system (guest OS) that hosts one or more applications within the virtual machine. The guest OSes running on the virtual machines 140 can be of the same or different types (e.g., all may be Windows operating systems, or some may be Windows operating systems and the others may be Linux operating systems). Moreover, the guest OSes and the host OS may share the same operating system type, or the host OS may be a different type of OS than one or more guest OSes. For example, a guest OS may be a Windows operating system from Microsoft and a host OS may be a Linux operating system available from Red Hat.

In one embodiment, each virtual machine 140 hosts or maintains a desktop environment providing virtual desktops for remote clients (e.g., client 115) and/or local clients (not shown). A virtual desktop is a virtualized desktop computer, and thus may include storage, an operating system, applications installed on the operating system (e.g., word processing applications, spreadsheet applications, email applications, etc), and so on. However, rather than these functions being provided and performed at the client 115, they are instead provided and performed by a virtual machine 140. A virtual desktop can represent an output (e.g., an image to be displayed) generated by a desktop application running within a virtual machine. Graphics data associated with the virtual desktop can be captured and transmitted to a client 115, where the virtual desktop may be rendered by a rendering agent and presented by a client application (not shown). In other embodiments, virtual machines 140 are not virtual desktops.

Some virtual machines 140 may be assigned VMs, in which case they have been assigned to a particular client 115 and/or user. Some VMs 140 may be unassigned VMs, in which case they are free to be assigned to any client and/or user that is authorized to use the VMs. In one embodiment, unassigned VMs are maintained in a VM pool cache 145. The host machine 105 may host VMs from multiple VM pools, and may include a separate VM pool cache 145 for each VM pool. The VM pools and VM pool cache 145 are discussed in greater detail below with reference to FIGS. 2 and 3.

In one embodiment, users access virtual machines 140 remotely via clients 115. Alternatively, users may access virtual machine 140 locally via terminals and/or input/output devices such as a mouse, keyboard and monitor. In one embodiment, virtual machines 140 communicate with clients 115 using a multichannel protocol (e.g., Remote Desktop Protocol (RDP), Simple Protocol for Independent Computing Environments (SPICE™ from Red Hat), etc.) that allows for connection between the virtual machine and end-user devices of the client via individual channels. The virtual machines 140 may include a virtual device for each end user device to allow virtual access to control and management functions of the client 115. In another embodiment, users access virtual machines 140 via input/output (I/O) devices (not shown) that are connected directly to host machine 105. The I/O devices include devices that enable a user to interact with one or more virtual machines 140, and may include, for example, a display, a keyboard, a mouse, a microphone, a usb port, a firewire port, and so on.

Each client 115 may be a personal computer (PC), palm-sized computing device, personal digital assistant (PDA), etc. Clients 115 may be fat clients (clients that perform local processing and data storage), thin clients (clients that perform minimal or no local processing and minimal to no data storage), and/or hybrid clients (clients that perform local processing but little to no data storage). In one embodiment, clients 115 essentially act as input/output devices, in which a user can view a desktop environment provided by a virtual machine 140 (e.g., a virtual desktop) on a monitor, and interact with the desktop environment via a keyboard, mouse, microphone, etc. In one embodiment, a majority of the processing is not performed at the clients 115, and is instead performed by virtual machines 140 hosted by the host machine 105.

The host machine 140 may be coupled to a host controller machine 110 (via network 120 as shown or directly). The host controller machine 110 may monitor and control one or more functions of host machines 105. In one embodiment, the host controller machine 110 includes a virtualization manager 130 that manages virtual machines 140. The virtualization manager 130 may manage one or more of provisioning of new virtual machines, connection protocols between clients and virtual machines, user sessions (e.g., user authentication and verification, etc.), backup and restore, image management, virtual machine migration, load balancing, and so on. Virtualization manager 130 may, for example, add a virtual machine, delete a virtual machine, balance the load on a host machine cluster, provide directory services to the virtual machines 140, and/or perform other management functions. The virtualization manager 130 in one embodiment acts as a front end for the host machines 105. Thus, clients 115 and/or I/O devices log in to the virtualization manager 130, and after successful login the virtualization manager 130 connects the clients or I/O devices to virtual machines 140. In another embodiment, clients 115 log directly in to host machines 105 without going through virtualization manager 130.

In one embodiment, virtualization manager 130 includes a virtual machine (VM) pool management module 160. The VM pool management module 160 automatically loads VMs 140 of a VM pool into the VM pool cache 145 on host machine 105. The VMs 140B, 140C in the VM pool cache 145 are active, unassigned VMs that are ready to be assigned to clients 115. The VM pool management module 160 may determine how many VMs to maintain in the VM pool cache 145 based on a VM pool cache size value, which may be a variable value that is periodically calculated by the VM pool management module 160. A VM pool cache may be a VM pool cache for a specific host or may be a VM pool cache that applies to multiple hosts. If the VM pool is associated with a particular host, then the size of the VM pool cache may be dependent on that host's available resources. In any case the actual VM pool size should be correlated with the actual available resources The VM pool management module 160 and VM pool cache 145 are discussed in greater detail below with reference to FIGS. 2 and 3, respectively.

Figure 2:
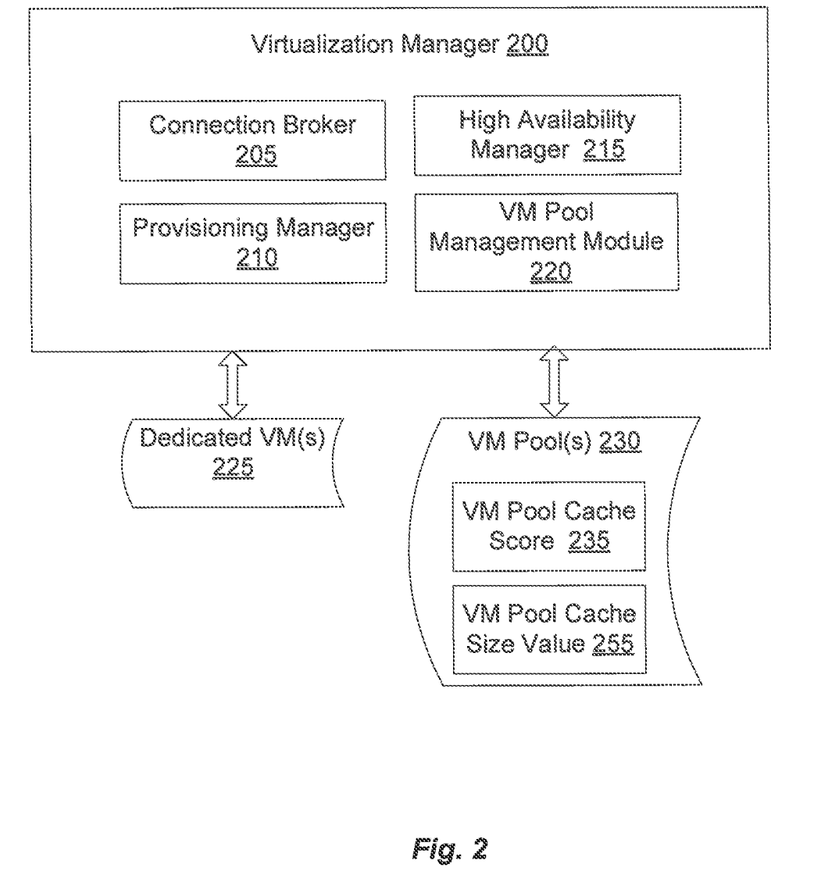
FIG. 2 is a block diagram illustrating a virtualization manager, in accordance with one embodiment of the present invention.

FIG. 2 is a block diagram illustrating an example of a virtualization manager 200, in accordance with one embodiment of the present invention. Virtualization manager 200 may correspond to virtualization manager 130 of FIG. 1. In one embodiment, virtualization manager 200 includes, but is not limited to, a connection broker 205, a provisioning manager 210, a high availability manager 215 and a VM Pool management module 220.

Provisioning manager 210 generates virtual machines and loads virtual machines onto host machines. Provisioning manager 210 may provision dedicated VMs 225 (also known as unique VMs) or VMs from VM pools 230. Dedicated VMs (unique VMs) 225 are stateful virtual machines that are used by a particular user or users. Such stateful virtual machines change over time as new applications are installed, configuration changes are made, new files are added, and so forth. These changes are saved between sessions. Therefore, each dedicated VM 225 may be unique, having its own files, application, etc. that are different than those installed on any other dedicated VM or VM pool.

A virtual machine pool 230 is a pool of identical virtual machines. Each of the VMs in a VM pool may be based on a single VM template, which may be a snapshot of a particular VM. Each of the virtual machines in a virtual machine pool is a stateless virtual machine. In one embodiment, after a session with a stateless virtual machine has ended, the stateless virtual machine will not keep any changes that were made to it during the session. Alternatively, a stateless virtual machine may keep changes for a brief period (e.g., until a timer times out or an administrator instructs the virtualization manager 200 to reset the VM). A stateless VM may be useful, for example, if a virtual machine is to be used in a public setting, such as at a school, library, etc. A stateless VM may also be useful for quality analysis, so that the same state can be checked repeatedly. Moreover, use of stateless VMs can provide increased security (e.g., by removing any potential malware after each session). VM pools 230 are discussed in greater detail below with reference to VM pool management module 220.

Provisioning a virtual machine includes determining a virtual machine to use and causing a host machine to load the virtual machine. Provisioning a virtual machine may include determining whether a requested virtual machine is available (e.g., is not presently being used by another client), and loading the virtual machine if it is available. Provisioning a virtual machine may also include creating a new virtual machine from scratch (e.g., generating a virtualized system, installing an operating system on the system, installing applications on the operating system, etc.) if an appropriate virtual machine cannot be found.

In one embodiment, to start a stateless virtual machine (e.g., a VM from a VM pool), the provisioning manager 210 generates a temporary snapshot of the current state of the virtual machine. The session of the virtual machine is started using the temporary snapshot. During the session, a user may save files, install new applications, and so forth. These new files, applications, etc. will remain in the virtual machine for the life of the session (or for the life of multiple sessions). However, all of these changes will be lost when the session is terminated, when a timer times out, or on receiving an administrator command. Once a session for a stateless virtual machine is terminated (or other condition is satisfied), the temporary snapshot (including all changes that have been made to the virtual machine during the session or sessions) is destroyed (e.g., deleted). Thus, the next time a new session of the virtual machine is started, it will be started with the state that the virtual machine had before the previous session took place. Therefore, in one embodiment the life-cycle of a stateless VM is as follows: 1) stateless VM is created as a snapshot of an existing base image, 2) stateless VM is assigned to a user to be used for a session (session may span any period of time), 3) the session terminates, which causes the stateless VM to be destroyed. The session may be terminated based on an event such as a timeout, a user command, an administrator command, etc.

Connection broker 205 manages client registration, authentication, VM assignment, and connections between clients and VMs. When a client registers with the virtualization manager 200, connection broker 205 associates one or more dedicated VMs 225 or VM pools 230 with the client and stores this information. Subsequently, when a registered client successfully authenticates itself to the virtualization manager 200, the client may select one of the dedicated VMs 225 or VM pools 230 that it is associated with. The connection broker 205 then establishes a connection to the selected VM 225 or a VM from the selected VM pool 230.

The connection broker 205 supports connections to dedicated virtual machines 225 and to virtual machine pools 230. For a dedicated virtual machine 225, the user selects a specific dedicated virtual machine 225. That virtual machine is loaded (e.g., by the provisioning manager 210), and then a session between the client and the dedicated virtual machine 225 is established. For a virtual machine pool 230, the VM pool 230 is assigned to the client. If there is a currently active unassigned VM in a VM pool cache of the VM pool, then a VM from the VM pool cache is assigned to the client. Otherwise, a new VM from the VM pool is loaded and assigned to the client.

There are three models for assigning VM pools 230 to clients: an automatic model, a manual model, and a time-based model. In the automatic model, when a user requests a connection to a VM pool 230, a VM from the VM pool is allocated for this user. The user can now connect and use the allocated VM throughout a single session. At the end of the session, when the user shuts down the VM, all changes that were made to the VM are discarded. The next time the user logs on to the VM pool, he/she is assigned to a "different" available VM from the VM pool 230. Changes that were made to documents saved on a network during a session with a stateless VM are not discarded, and may later be accessed from a different VM.

The manual mode works similar to the automatic mode; except that the user has access to the VM (assigned from the pool) until an administrator decides to remove the user from the pool and to return the VM to the original image state (i.e. all the changes made to the image are discarded). Therefore, for manual mode VM pools, a session may last between client logins and/or changes may be saved between sessions.

For time-based VM pools, a VM from a VM pool is assigned to a user for a certain period of time. When a user logs in, he/she gets a VM from the VM pool which belongs to him/her until the time expires. When the time expires, the VM is returned to a base image snapshot shared by all VMs of the VM pool 230, and then all the changes made to the VM during the last session are discarded. This is helpful in use cases where there is a defined time for which a user needs a VM.

High availability manager 215 performs load balancing of host machines and migrates VMs between host machines. The high availability manager 215 may monitor virtual machines running on host machines, and load balance the host machines as necessary. For example, if multiple VMs running on a host machine suddenly shut down, a load imbalance may occur such that that the host machine is underutilized as compared to other host machines. The high availability manager 215 may respond to the load imbalance by migrating virtual machines from host machines that are hosting many virtual machines to the host machine that is hosting few or no virtual machines to redistribute load.

To migrate a virtual machine, the high availability manager 215 saves a state of the virtual machine. The high availability manager 215 then starts a new virtual machine on a different host using the saved state. Once the new virtual machine is up and running, the high availability manager 215 may redirect a client that is using the original virtual machine to the new virtual machine. The original virtual machine can then be shut down. Migration can occur with little to no interruption to the client. In one embodiment, the virtual machines (or applications, processes, etc.) are live migrated to other hosts. Live migration of a VM is the transfer of the VM from one host to another host, while the guest OS of the VM continues to run, and client is attached (no need to reconnect). Live migration provides minimal interruption and service downtime to the VM and its end user.

The high availability manager 215 may use multiple different techniques for performing load balancing. In one embodiment a stop-and-run load balancing/high availability technique is used. In another embodiment, a live migration load balancing/high availability technique is used.

Virtual machine pool management module 220 manages VM pools 230. Each VM pool 230 has a VM pool cache size value 255 (e.g., 5 VMs, 10 VMs, etc.). The VM pool cache size value 255 identifies how many active, unassigned VMs to maintain in a VM pool cache. The VM pool cache represents a portion of system resources (e.g., memory and/or processor cycles) that are allocated to active, unassigned VMs from a particular VM pool 230. The larger a VM pool cache size, the more active, unassigned VMs from the VM pool that are maintained (and therefore the more system resources that are required to maintain the VM pool cache). A VM pool 230 may have a separate VM pool cache size value 255 for each host machine associated with the VM pool. Alternatively, there may be a single VM pool cache size value 255 that is associated with multiple host machines (e.g., with a host machine cluster). For a time-based VM pool, the VM pool cache size value may be based on a number of expected users (e.g., a number of students in a class) or a percentage of the number of expected users.

The VM pool cache size value (or values) may be a fixed value or a variable calculated value. Moreover, the VM pool cache size value may be an arbitrary value (e.g., a value of five VM pools, assigned by an administrator), or a value that relates to some metric. For example, the cache size value may be based on a size of the VM pool (e.g., 10% of VM pool size), an amount of available resources on the host machine, a time of day, or other criteria. In one embodiment, the VM pool management module 220 updates the VM pool cache size value when one or more pre-determined conditions are satisfied. Such conditions may include a change in the VM pool size, a change in host machine resource utilization, a change in the time of day or day of week, and so on If a VM pool cache does not include the number of active, unassigned VMs indicated by the VM pool cache size value 255 (if the number of active, unassigned VMs is below the VM pool cache size value), VM pool management module 220 may direct provisioning manager 210 to load additional VMs into the VM pool cache. Additionally, if there are more active, unassigned VMs in a VM pool cache than indicated by the VM pool cache size value, the VM pool management module 220 may direct the high availability manager 215 to suspend or migrate one or more VMs in the VM pool cache. The high availability manager 215 may also report load imbalances to the VM Pool management module 160, which may modify a VM pool cache size for one or more VM pools to correct the load imbalance.

In one embodiment, the VM pool management module 220 computes VM pool cache scores 235 for each VM pool 230. These VM pool cache scores 235 can be used by the high availability manager 215 for prioritizing between VM pools (e.g., when performing load balancing of VMs in VM pools). The VM pool management module 220 may compute VM pool cache scores 235 based on VM pool cache sizes, total sizes of VM pools, number of active, assigned VMs in VM pools, VM pool priorities, and other information. For example, when system resource utilization for a host machine exceeds a threshold value, the high availability manager 215 may begin migrating and/or suspending VMs. Since suspending or migrating a VM in a VM cache does not affect any users, these VMs are migrated/suspended prior to active assigned VMs. In one embodiment, VMs from VM pools having the highest VM pool cache score are migrated/suspended first, followed by VMs from VM pools having lower VM pool cache scores. As VMs are migrated/suspended, the VM pool cache scores for associated VM pools are reduced.

In one embodiment, the VM pool management module 220 increases the VM pool cache size values 255 for one or more VM pools when system resource utilization falls below a lower threshold. In response, provisioning manager 210 may load VMs into VM pool caches for those one or more VM pools. This in turn may cause the VM pool cache scores for these VM pools to be increased.

In one embodiment, the VM pool management module 220 decreases the VM pool cache size value 255 for one or more VM pools when system resource utilization increases above the upper threshold. In response, high availability manager 215 may suspend and/or migrate VMs in the VM pool caches for those one or more VM pools. This may cause the VM pool cache score for those VM pools to be lowered.

In one embodiment, different algorithms are used to compute VM pool cache scores for different load balancing modes. For example, a first algorithm may be used when a power saving load balancing mode is active, and a second algorithm may be used when a resource utilization equalizing load balancing mode is active.

The VM pool cache for a VM pool can be enabled or disabled by an administrator. When the VM pool cache is enabled, VMs are automatically loaded into the VM pool cache. When the VM pool cache is disabled, any active, unassigned VMs in the VM pool cache are shut down.

Figure 3:
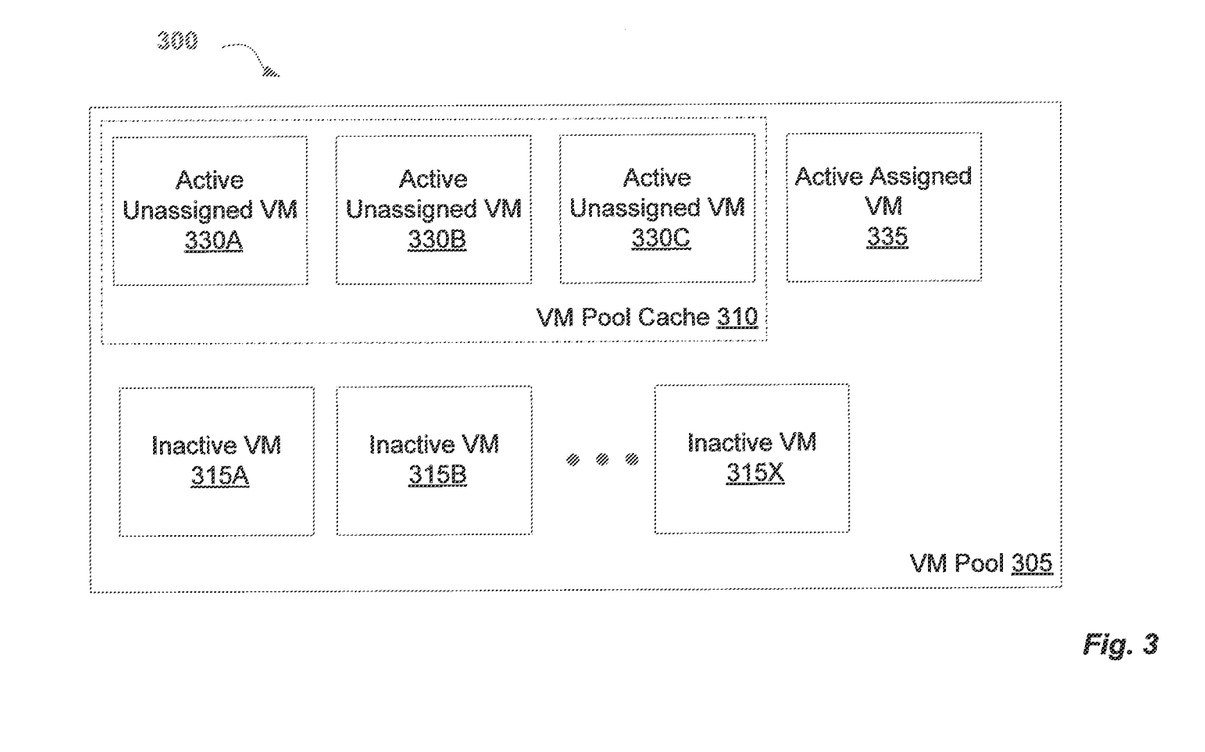
FIG. 3 is a block diagram illustrating an example virtual machine pool.

FIG. 3 illustrates a virtual machine pool 305, in accordance with one embodiment of the present invention. Virtual machine pools 305 enable enterprises to deploy a pool of virtual machines to a group of users, either for a limited time or to host specific applications that need to be shared amongst these users or VM configurations.

VM pool 305 may be assigned any number of VMs. More users may be given permission to access VMs in VM pool 305 than there are VMs available in the VM pool 305. In one embodiment, the VM pool has a VM pool cache 310 with a specified VM pool cache size. Note that the pool size and the pool cache size can be dynamically determined according to one or more parameters. For example, the pool size and/or pool cache size may be computed based on load, number of users, system resources, time of day, load balancing scheme, etc.

In one embodiment, the VM pool 305 includes three categories of VMs: inactive VMs 315, active unassigned VMs 330 and active assigned VMs 335. The combination of inactivity on this 315, active unassigned VMs 330 and active assigned VMs 335 together represent the total size of beam pool 305.

Inactive VMs 315 are VMs that are not presently loaded onto any host machine. Active unassigned VMs 330 are VMs to have been preloaded onto a host machine (e.g., into a VM pool cache 310 on a host machine). When a client/user requests a VM from VM pool 305, an active unassigned VM 330 may be assigned from the VM pool cache 310 without requiring a client/user to wait for VM to be loaded. An inactive VM 315 may then be loaded into the VM pool cache 310 automatically to replace the recently assigned VM. Active assigned VMs 335 are those VMs that are presently assigned to users and/or clients (e.g., VMs that have active sessions in progress).

FIGS. 4-7 illustrate embodiments of methods. These methods may be performed by processing logic that may comprise hardware (circuitry, dedicated logic, etc.), software (such as is run on a general purpose computer system or a dedicated machine), or a combination of both. In certain embodiments, the methods are performed by host controller machine 110 and/or a host machine 105, as depicted in FIG. 1. The methods may be performed by a virtualization manager (e.g., virtualization manager 200 of FIG. 2) that runs, for example, on a host controller machine.

Figure 4:
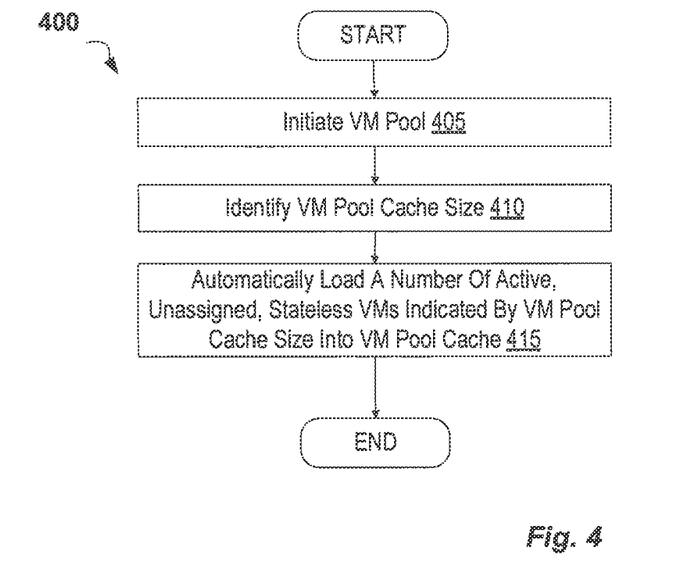
FIG. 4 is a flow diagram illustrating a method for adding virtual machines to a virtual machine pool cache.

FIG. 4 is a flow diagram illustrating one embodiment for a method 400 of adding virtual machines to a virtual machine pool cache. At block 405 of method 400, processing logic (e.g., a virtualization manager) initiates a VM pool. Processing logic may initiate the VM pool in response to receiving a command (e.g., from an administrator) to initiate the VM pool. Initiating a VM pool may include receiving a selection of the VM pool and/or receiving a selection of a host or hosts on which to load VMs from the VM pool. Initiating the VM pool may also include assigning the VM pool to a selected host or hosts, and changing a status of the VM pool to available. Once the VM pool has been initiated, clients may request connections to VMs from the VM pool.

At block 410, processing logic identifies a VM pool cache size value. The VM pool cache size value may be a specified number of VMs. The VM pool cache size value may also be a variable value that is computed from one or more metrics. For example, the VM pool cache size value may be specified as a percentage of the VM pool size (e.g., 5% of the VM pool size). Therefore, if the VM pool size is 100 VMs, then the VM pool cache size would be 5 VMs. The VM pool cache size value may also be dependent, for example, on a current resource utilization of a host machine, a time of day, other VM pools and/or VMs that share a host machine with the VM pool, etc.

At block 415, processing logic automatically loads a number of active, unassigned, stateless VMs indicated by the VM pool cache size value into a VM pool cache. The VMs may be automatically loaded without any user input, and may be loaded prior to receiving any requests for a VM of the VM pool. In one embodiment, the VMs in the VM pool are loaded sequentially into the VM pool cache. The VMs in the VM pool cache are then ready to be assigned to any clients and/or users that request a VM. The VMs in the VM pool cache may be connected to the requesting client/user without the delay inherent in loading a VM.

Figure 5:
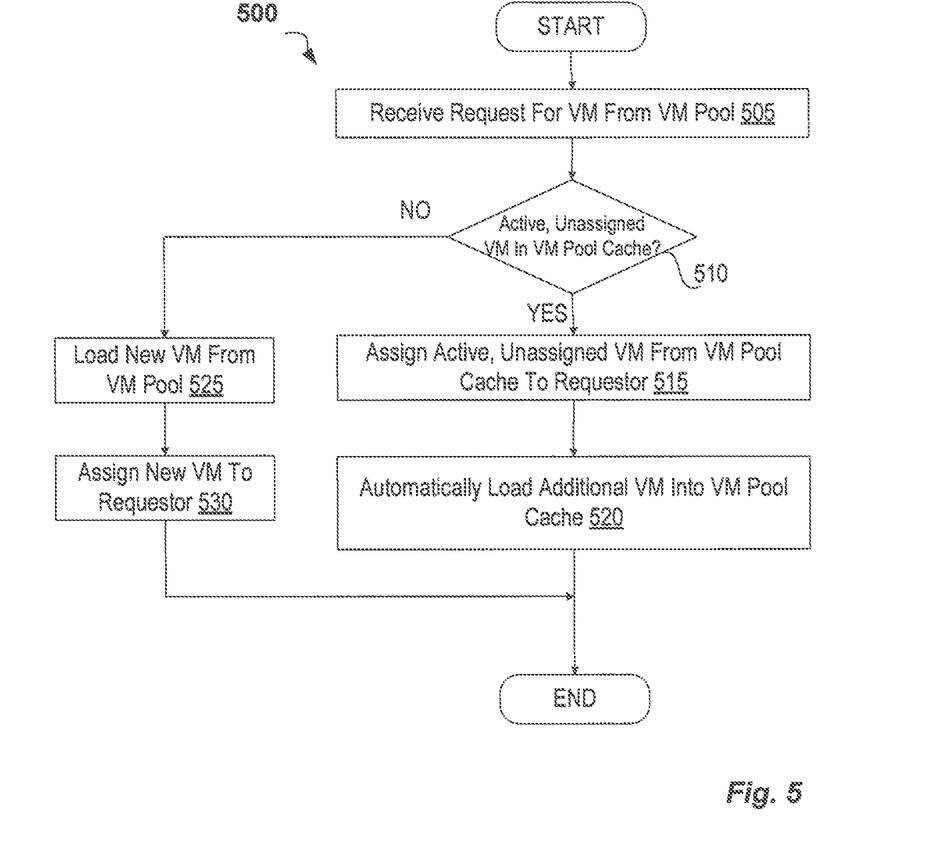
FIG. 5 is a flow diagram illustrating a method for assigning virtual machines from a virtual machine pool cache to a client.

FIG. 5 is a flow diagram illustrating one embodiment for a method 500 of assigning a VM from a VM pool cache to a client. At block 505 of method 500, processing logic (e.g., a virtualization manager) receives a request for a virtual machine of a VM pool. The request may be received from a local client or a remote client. At block 510, processing logic determines whether there are any active, unassigned VMs in a VM pool cache of the VM pool. If there are no active, unassigned VMs in the VM pool cache, the method proceeds to block 525. If there is an active, unassigned VM in the VM pool cache, the method continues to block 515.

At block 525, processing logic loads a new virtual machine from the VM pool. At block 530, the processing logic of assigns the new VM to the requester.

At block 515, processing logic assigns an active, unassigned VM from the VM pool cache to the requester. At block 520, processing logic then automatically loads an additional VM into the VM pool cache. This enables in the VM pool cache to maintain a VM pool cache size specified by a VM pool cache size value. The method then ends.

Figure 6:
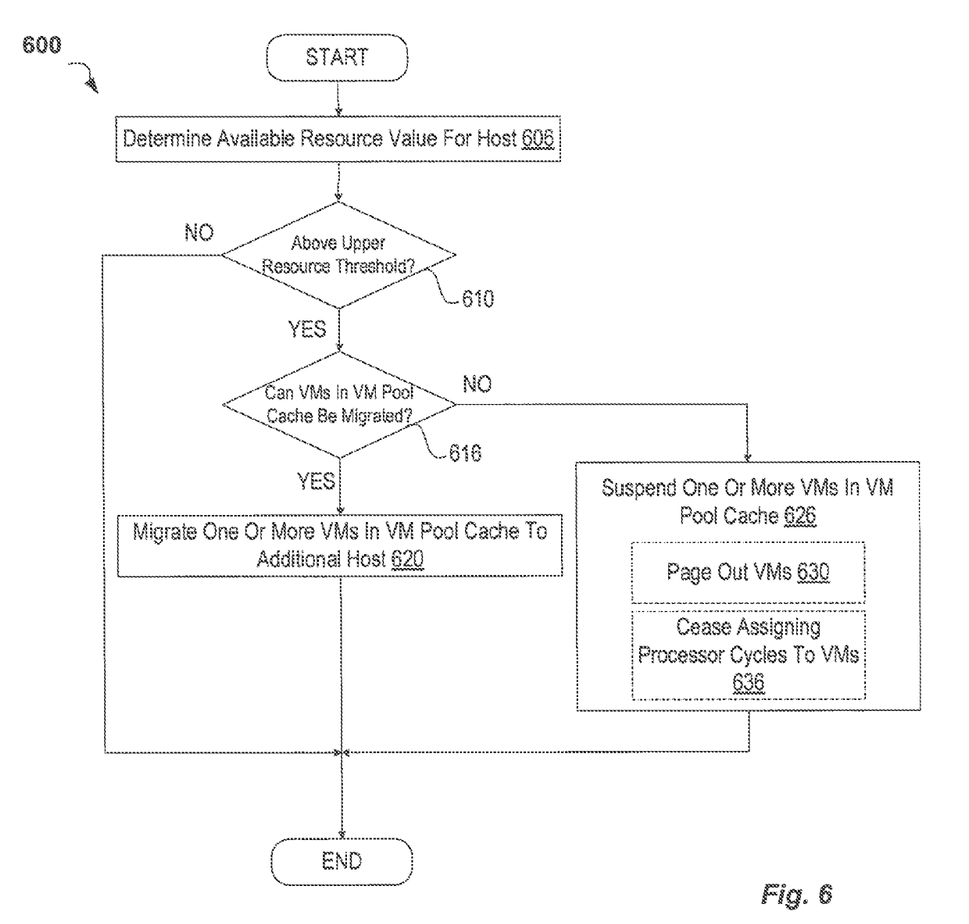
FIG. 6 is a flow diagram illustrating a method for load balancing a virtual machine pool.

FIG. 6 is a flow diagram illustrating one embodiment for a method 600 of load balancing a host machine that includes a VM pool. At block 606 of method 600, processing logic determines an available resource value for a host that hosts the VM pool. The available resource value may be based on the total amount of unused system resources for the host. Alternatively, an available resource value may be based on a ratio between total resources for the host and unused resources of the host. Other load-balancing metrics may also be used.

At block 610, processing logic determines whether the available resource value is above an upper resource threshold. If the available resource value is above an upper resource threshold, the method continues to block 616. Otherwise, the method ends.

At block 616, processing logic determines whether any VMs in the VM pool cache can be migrated to other hosts. If any VMs can be migrated, the method proceeds to block 620 and one or more VMs in the VM pool cache are migrated to an additional host. This frees up system resources on the host without reducing an amount of available, unassigned VMs for a VM pool. If a VM cannot be migrated (or if not enough the VMs can be migrated to bring the available resource value below the upper threshold), the method proceeds to block 626.

At block 626, processing logic suspends one or more VMs in the VM pool cache. In one embodiment, suspending a VM includes paging out the VM (moving data for the VM from active memory to virtual memory that may be stored on disk) at block 630. In one embodiment, suspending a VM includes ceasing to assign processor cycles to the VM (block 636). Therefore, a suspended VM does not consume processor resources or memory resources of a host. Migrating and/or suspending VMs in VM pool caches when system resource utilization is high ensures that VM pool caches do not impair (or only slightly) the performance of active VMs currently in use.

Figure 7:
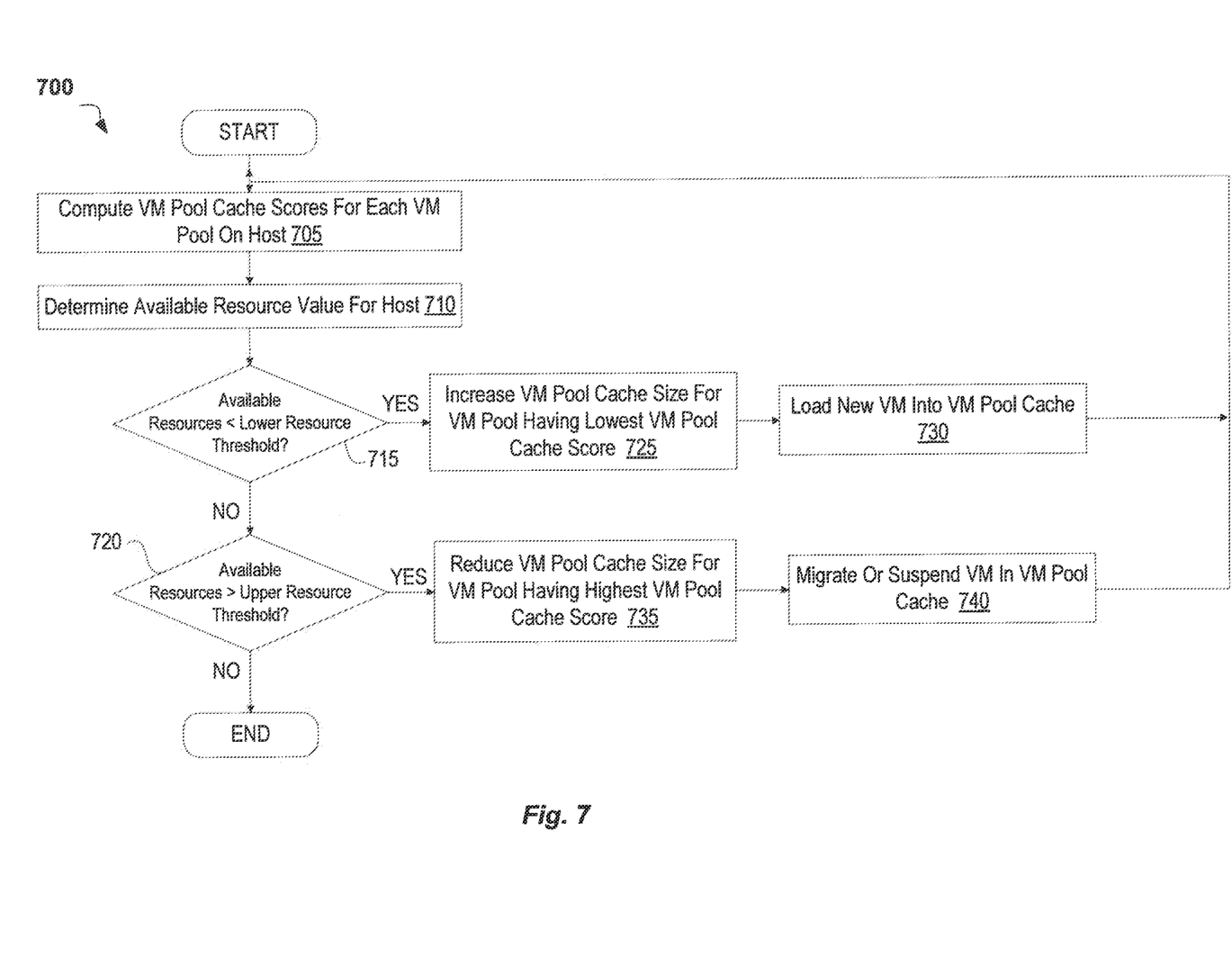
FIG. 7 is a flow diagram illustrating another method for load balancing a virtual machine pool.

FIG. 7 is a flow diagram illustrating another embodiment for a method 700 of load balancing a host machine that includes a VM pool. At block 705 of method 700, processing logic computes VM pool cache scores for each VM pool on a host. The VM pool cache scores may be computed based on sizes of VM pool caches on the host. Alternatively, VM pool cache scores may be computed based on sizes of VM pool caches on multiple hosts. Other factors may also affect a VM pool cache score, such as a total size of the VM pools, the relative size of the VM pool caches to the sizes of the VM pools, assigned priorities of VM pools, and so on.

At block 710, processing logic determines an available resource value for a host (or hosts) that hosts the VM pool. At block 715, processing logic determines whether the available resource value is below a lower threshold. If the available resource value is below the lower threshold, the method proceeds to block 725. Otherwise, the method proceeds to block 720.

At block 725, processing logic increases a VM pool cache size value for the VM pool having the lowest VM pool cache score. Alternatively, the VM pool cache size value for some other VM pool may be increased. This causes the number of VMs in that VM pool cache to be lower than the VM pool cache size value. Therefore, at block 730 processing logic loads a new VM into the VM pool cache. The VM pool cache size then again corresponds to the VM pool cache size value. The method then returns to block 705.

At block 720, processing logic determines whether the available resource value is above an upper threshold. If the available resource value is above the upper threshold, the method proceeds to block 735. Otherwise, the method ends.

At block 735, processing logic reduces a VM pool cache size value for the VM pool having the highest VM pool cache score. Alternatively, the VM pool cache size value for some other VM pool may be reduced. This causes the number of VMs in that VM pool cache to be greater than the VM pool cache size value. Therefore, at block 740 processing logic migrates or suspends a VM in that VM pool cache. The VM pool cache size then again corresponds to the VM pool cache size value. The method returns to block 705.

Applying method 700, processing logic prioritizes VM pools. Thus, processing logic can determine which VM pools are most suited to have their VM pool caches increase in size, and which VM pools are most suited to have their VM pool caches decrease in size.

Figure 8:
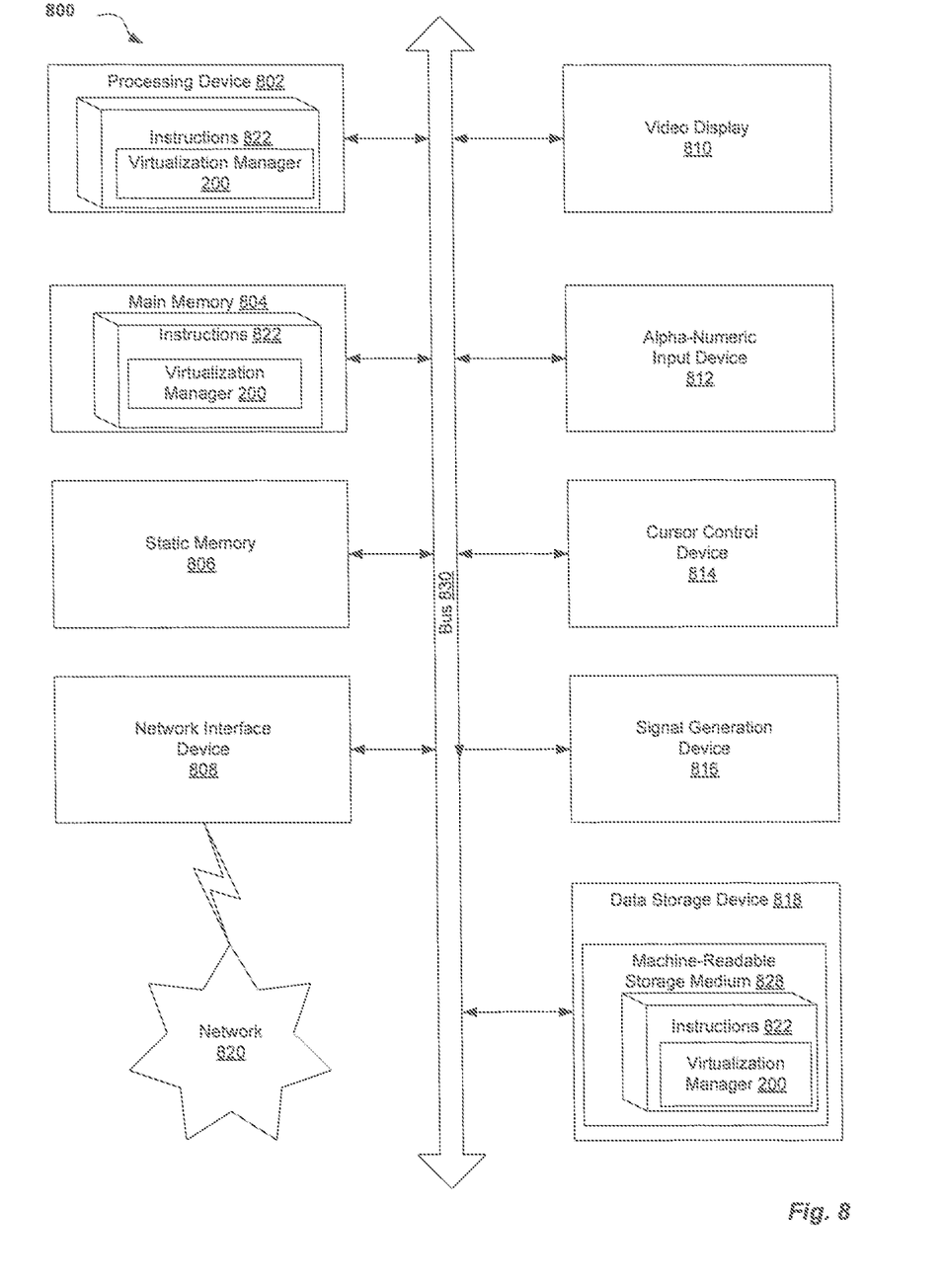
FIG. 8 illustrates a diagrammatic representation of a machine in the exemplary form of a computer system which may be used with an embodiment of the invention.

FIG. 8 illustrates a diagrammatic representation of a machine in the exemplary form of a computer system 800 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 800 includes a processing device 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a data storage device 818, which communicate with each other via a bus 830.

Processing device 802 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 is configured to execute instructions 822 for performing the operations and steps discussed herein.

The computer system 800 may further include a network interface device 808. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

The data storage device 818 may include a machine-readable storage medium 828 (also known as a computer-readable medium) on which is stored one or more sets of instructions or software 822 embodying any one or more of the methodologies or functions described herein. The software 822 may also reside, completely or at least partially, within the main memory 804 and/or within the processing device 802 during execution thereof by the computer system 800, the main memory 804 and the processing device 802 also constituting machine-readable storage media.

The machine-readable storage medium 828 may also be used to store instructions for a virtualization manager (e.g., virtualization manager 200 of FIG. 2) and/or a software library containing methods that call a virtualization manager. While the machine-readable storage medium 828 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

Thus, techniques for maintaining a VM pool cache have been described herein. Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "initiating" or "identifying" or "loading" or "determining" or "receiving" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable medium.

In the foregoing specification, embodiments of the invention have been described with reference to specific exemplary embodiments thereof. It will be evident that various modifications may be made thereto without departing from the broader spirit and scope of embodiments of the invention as set forth in the following claims. The specification and drawings are, accordingly, to be regarded in an illustrative sense rather than a restrictsense.

What is claimed is:

1. A computer-implemented method, comprising:
    initiating a virtual machine pool by a processing device, the virtual machine pool comprising a plurality of stateless virtual machines;
    identifying a virtual machine pool cache size value for the virtual machine pool, the virtual machine pool cache size value to indicate a number of active, unassigned, stateless virtual machines to maintain in a virtual machine pool cache for the virtual machine pool; and
    loading the indicated number of active, unassigned, stateless virtual machines into the virtual machine pool cache for the virtual machine pool prior to receiving a request for one of the plurality of stateless virtual machines.

2. The computer-implemented method of claim 1, further comprising:
    receiving a request for one of the plurality of stateless virtual machines in the virtual machine pool from a requester;
    assigning one of the active, unassigned, stateless virtual machines from the virtual machine pool cache to the requester; and
    loading an additional stateless virtual machine into the virtual machine pool cache for the virtual machine pool to maintain the indicated number of active, unassigned, stateless virtual machines in the virtual machine pool cache.

3. The computer-implemented method of claim 1, further comprising:
    determining whether an available resource value for a host hosting the virtual machine pool is below a resource threshold;
    if the available resource value is below the resource threshold, determining whether one or more of the active, unassigned, stateless virtual machines in the virtual machine pool cache can be migrated to another host; and
    if the one or more active, unassigned, stateless virtual machines can be migrated to the other host, migrating the one or more active, unassigned, stateless virtual machines to the other host.

4. The computer-implemented method of claim 3, further comprising:
    if the one or more active, unassigned, stateless virtual machines in the virtual machine pool cache cannot be migrated to another host, suspending the one or more active, unassigned, stateless virtual machines, the suspending comprising:
        paging out the one or more active, unassigned, stateless virtual machines to virtual memory; and
        ceasing to assign processor cycles to the one or more active, unassigned, stateless virtual machines.

5. The computer-implemented method of claim 1, wherein an additional virtual machine pool is hosted by a host that also hosts the virtual machine pool, the additional virtual machine pool comprising an additional virtual machine pool cache and a number of additional active, unassigned, stateless virtual machines in view of a virtual machine pool cache size value of the additional virtual machine pool, the method further comprising:
    determining a first virtual machine pool cache score for the virtual machine pool and a second virtual machine pool cache score for the additional virtual machine pool; and
    if available resources are greater than a lower resource threshold, increasing the virtual machine pool cache size value for the virtual machine pool having the lowest virtual machine pool cache score.

6. The computer-implemented method of claim 5, further comprising:
    if the available resources are below an upper resource threshold, reducing the virtual machine pool cache size value for the virtual machine pool comprising the highest virtual machine pool cache score.

7. The method of claim 1, wherein the virtual machine pool cache size value is in view of at least one of: available host resources, other virtual machine pools running on the host, time of day, and a size of the virtual machine pool.

8. A non-transitory computer readable storage medium comprising instructions that, when executed by a processing device, cause the processing device to perform operations, comprising:
    initiating a virtual machine pool by the processing device, the virtual machine pool comprising a plurality of stateless virtual machines;
    identifying a virtual machine pool cache size value for the virtual machine pool, the virtual machine pool cache size value to indicate a number of active, unassigned, stateless virtual machines to maintain in a virtual machine pool cache for the virtual machine pool; and
    loading the indicated number of active, unassigned, stateless virtual machines into the virtual machine pool cache for the virtual machine pool prior to receiving a request for one of the plurality of stateless virtual machines.

9. The non-transitory computer readable storage medium of claim 8, the method further comprising:
    receiving a request for one of the plurality of stateless virtual machines in the virtual machine pool from a requester;
    assigning one of the active, unassigned, stateless virtual machines from the virtual machine pool cache to the requester; and
    loading an additional stateless virtual machine into the virtual machine pool cache for the virtual machine pool to maintain the indicated number of active, unassigned, stateless virtual machines in the virtual machine pool.

10. The non-transitory computer readable storage medium of claim 8, the method further comprising:
    determining whether an available resource value for a host hosting the virtual machine pool is below a resource threshold;
    if the available resource value is below the resource threshold, determining whether one or more of the active, unassigned, stateless virtual machines in the virtual machine pool cache can be migrated to another host; and if the one or more active, unassigned, stateless virtual machines can be migrated to the other host, migrating the one or more active, unassigned, stateless virtual machines to the other host.

11. The non-transitory computer readable storage medium of claim 10, the method further comprising:
if the one or more active, unassigned, stateless virtual machines in the virtual machine pool cache cannot be migrated to another host, suspending the one or more active, unassigned, stateless virtual machines, the suspending comprising:
paging out the one or more active, unassigned, stateless virtual machines to virtual memory; and
ceasing to assign processor cycles to the one or more active, unassigned, stateless virtual machines.

12. The non-transitory computer readable storage medium of claim 8, wherein an additional virtual machine pool is hosted by a host that also hosts the virtual machine pool, the additional virtual machine pool comprising an additional virtual machine pool cache and a number of additional active, unassigned, stateless virtual machines in view of a virtual machine pool cache size value of the additional virtual machine pool, the method further comprising:
determining a first virtual machine pool cache score for the virtual machine pool and a second virtual machine pool cache score for the additional virtual machine pool; and
if available resources are greater than a lower resource threshold, increasing the virtual machine pool cache size value for the virtual machine pool comprising the lowest virtual machine pool cache score.

13. The non-transitory computer readable storage medium of claim 12, the method further comprising:
if the available resources are below an upper resource threshold, reducing the virtual machine pool cache size value for the virtual machine pool comprising the highest virtual machine pool cache score.

14. The non-transitory computer readable storage medium of claim 8, wherein the virtual machine pool cache size value is in view of at least one of: available host resources, other virtual machine pools running on the host, time of day, and a size of the virtual machine pool.

15. A system, comprising:
a first computing device comprising: a memory comprising instructions for a virtualization manager, and a processing device to execute the instructions, wherein the instructions cause the processing device to:
initiate a virtual machine pool, the virtual machine pool comprising a plurality of stateless virtual machines;
identify a virtual machine pool cache size value for the virtual machine pool, the virtual machine pool cache size value indicating a number of active, unassigned, stateless virtual machines to maintain in a virtual machine pool cache for the virtual machine pool; and
load the indicated number of active, unassigned, stateless virtual machines into the virtual machine pool cache for the virtual machine pool prior to receiving a request for one of the plurality of stateless virtual machines.

16. The system of claim 15, further comprising:
a second computing device, networked to the first computing device, to host the virtual machine pool, the second computing device comprising an additional processing device to execute the indicated number of active, unassigned, stateless virtual machines.

17. The system of claim 16, wherein the second computing device to host an additional virtual machine pool, the additional virtual machine pool comprising an additional virtual machine pool cache and a number of additional active, unassigned, stateless virtual machines in view of a virtual machine pool cache size value of the additional virtual machine pool, and wherein the instructions further cause the processing device to:
determine a first virtual machine pool cache score for the virtual machine pool and a second virtual machine pool cache score for the additional virtual machine pool;
increase the virtual machine pool cache size value for the virtual machine pool comprising the lowest virtual machine pool cache score if available resources are greater than a lower resource threshold; and
reduce the virtual machine pool cache size value for the virtual machine pool comprising the highest virtual machine pool cache score if the available resources are below an upper resource threshold.

18. The system of claim 15, further comprising the instructions to cause the processing device to:
receive a request for one of the plurality of stateless virtual machines in the virtual machine pool from a requester;
assign one of the active, unassigned, stateless virtual machines from the virtual machine pool cache to the requester; and
load an additional stateless virtual machine into the virtual machine pool cache for the virtual machine pool to maintain the indicated number of active, unassigned, stateless virtual machines in the virtual machine pool cache.

19. The system of claim 15, further comprising the instructions to cause the processing device to:
determine whether an available resource value for a host hosting the virtual machine pool is below a resource threshold;
if the available resource value is below the resource threshold, determine whether one or more of the active, unassigned, stateless virtual machines in the virtual machine pool cache can be migrated to another host; and
if the one or more active, unassigned, stateless virtual machines can be migrated to the other host, migrate the one or more active, unassigned, stateless virtual machines to the other host.

20. The system of claim 19, further comprising the instructions to cause the processing device to:
suspend the one or more active, unassigned, stateless virtual machines if the one or more active, unassigned, stateless virtual machines in the virtual machine pool cache cannot be migrated to another host, the suspending comprising:
paging out the one or more active, unassigned, stateless virtual machines to virtual memory; and
ceasing to assign processor cycles to the one or more active, unassigned, stateless virtual machines.

* * * * *